(12) United States Patent
Taquino

(10) Patent No.: US 9,938,681 B1
(45) Date of Patent: *Apr. 10, 2018

(54) FLOATING OIL CONTAINMENT BOOM

(71) Applicant: Weldon Taquino, Cypremort Point, LA (US)

(72) Inventor: Weldon Taquino, Cypremort Point, LA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/576,009

(22) Filed: Dec. 18, 2014

Related U.S. Application Data

(63) Continuation of application No. 13/173,808, filed on Jun. 30, 2011, now Pat. No. 8,915,673.

(60) Provisional application No. 61/360,813, filed on Jul. 1, 2010.

(51) Int. Cl.
*E02B 15/04* (2006.01)
*E02B 15/06* (2006.01)
*E02B 15/10* (2006.01)

(52) U.S. Cl.
CPC ............ *E02B 15/045* (2013.01); *E02B 15/04* (2013.01); *E02B 15/048* (2013.01); *E02B 15/06* (2013.01); *E02B 15/10* (2013.01)

(58) Field of Classification Search
CPC ..... E02B 15/08; E02B 15/0814; E02B 15/085
USPC .............................................. 405/63, 70, 71
See application file for complete search history.

(56) References Cited

U.S. PATENT DOCUMENTS

| | | | | |
|---|---|---|---|---|
| 3,563,036 A | * | 2/1971 | Smith | E02B 15/08 405/69 |
| 3,592,005 A | | 7/1971 | Greenwood | |
| 3,720,062 A | | 3/1973 | Mack | |
| 3,751,925 A | * | 8/1973 | Thurman | E02B 15/08 405/63 |
| 3,779,020 A | * | 12/1973 | Muramatsu | E02B 15/08 405/64 |
| 3,852,978 A | * | 12/1974 | Fossberg | E02B 15/08 405/67 |
| 4,033,137 A | | 7/1977 | Geist | |
| 4,062,191 A | * | 12/1977 | Preus | E02B 15/06 210/923 |
| 4,096,700 A | | 6/1978 | Muramatsu et al. | |
| 4,155,664 A | | 5/1979 | Acheson | |
| 4,174,185 A | * | 11/1979 | Toki | E02B 15/08 405/212 |
| 4,174,186 A | | 11/1979 | Kasai et al. | |
| 4,188,155 A | * | 2/1980 | Langermann | E02B 15/08 405/63 |

(Continued)

*Primary Examiner* — Thomas B Will
*Assistant Examiner* — Katherine J Chu
(74) *Attorney, Agent, or Firm* — Garvey, Smith & Nehrbass, Patent Attorneys, L.L.C.; Charles C. Garvey, Jr.; Vanessa M. D'Souza

(57) ABSTRACT

A floating oil containment boom is comprised of boom sections connected end to end. Each boom section is of a tubular member or pipe section. The pipe or tubular member is buoyant, either closed at its ends and/or filled with foam or other buoyant material. Plates extend above and below the tubular member or pipe section for each section of boom. A specially configured connecter joins each boom section to the other, the connecter extending above and below the pipe or tubular member. An elastomeric block forms an interface between connectors on each boom section while simultaneously sealing the area between boom sections to flow of oil.

10 Claims, 11 Drawing Sheets

(56) References Cited

U.S. PATENT DOCUMENTS

| | | | | |
|---|---|---|---|---|
| 4,270,874 | A | * | 6/1981 | March ............... E02B 15/08 |
| | | | | 405/63 |
| 4,295,756 | A | * | 10/1981 | Blair ................ E02B 15/08 |
| | | | | 24/453 |
| 4,300,856 | A | * | 11/1981 | Magoon ............ E02B 15/08 |
| | | | | 405/66 |
| 4,422,797 | A | * | 12/1983 | McAllister ........ E02B 15/08 |
| | | | | 405/63 |
| 4,507,017 | A | | 3/1985 | Magoon |
| 5,000,616 | A | | 3/1991 | Bell et al. |
| 5,110,236 | A | * | 5/1992 | Santamaria ...... E02B 15/0814 |
| | | | | 405/60 |
| 5,238,327 | A | * | 8/1993 | Blair ................ E02B 15/08 |
| | | | | 405/68 |
| 5,299,886 | A | | 4/1994 | Whitaker |
| 5,480,262 | A | | 1/1996 | Russo, III |
| 5,580,185 | A | * | 12/1996 | Ware ............... E02B 15/08 |
| | | | | 405/63 |
| 5,713,698 | A | | 2/1998 | Worsley |
| 7,140,599 | B1 | | 11/2006 | Spink |
| 8,915,673 | B1 | | 12/2014 | Taquino |

\* cited by examiner

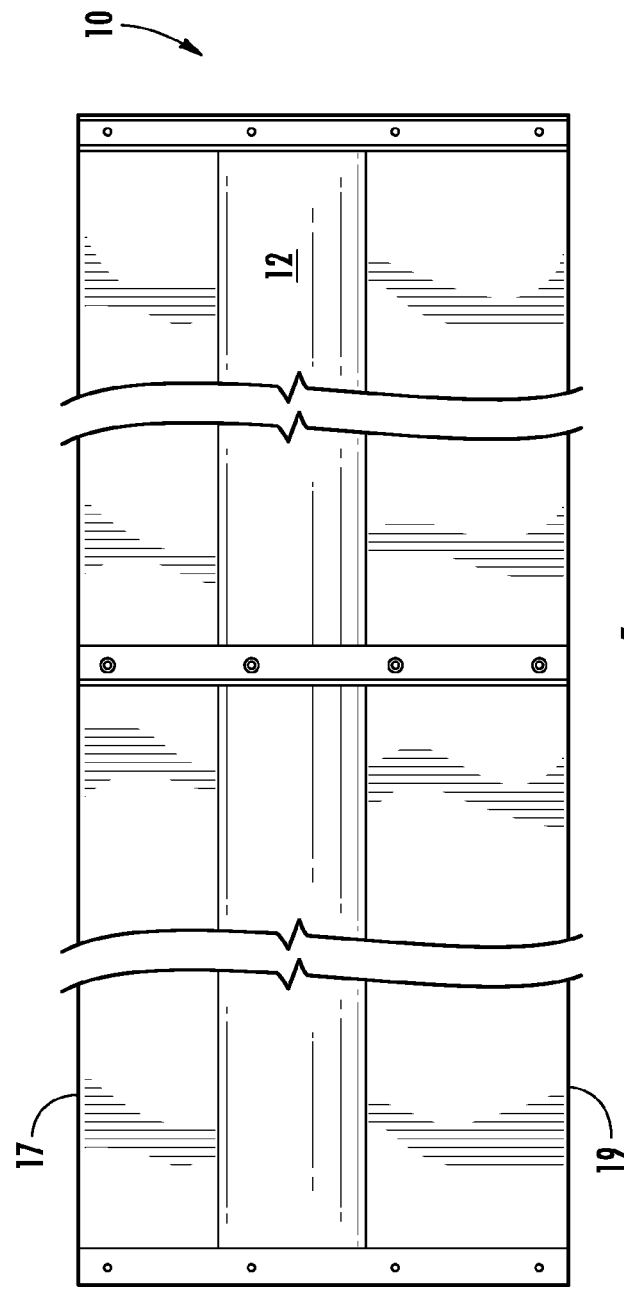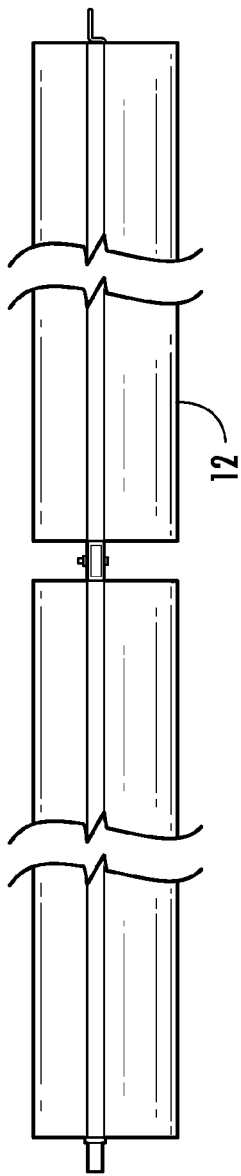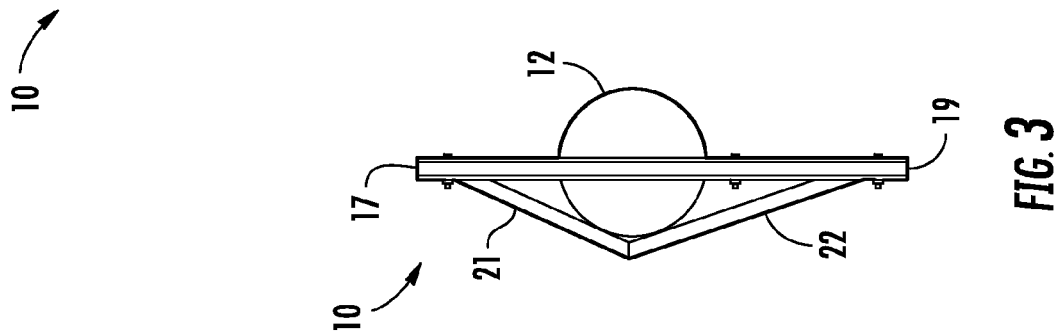

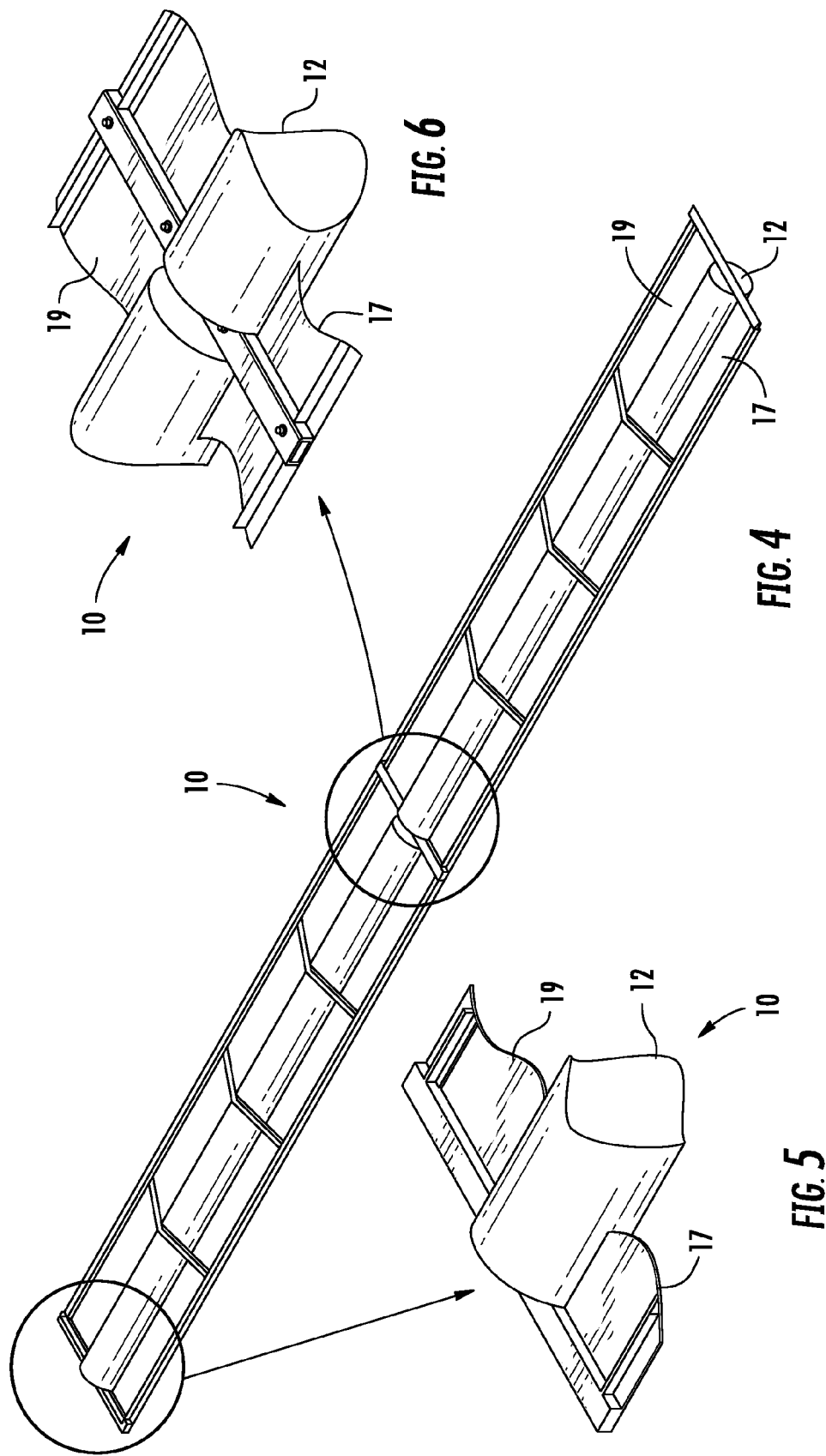

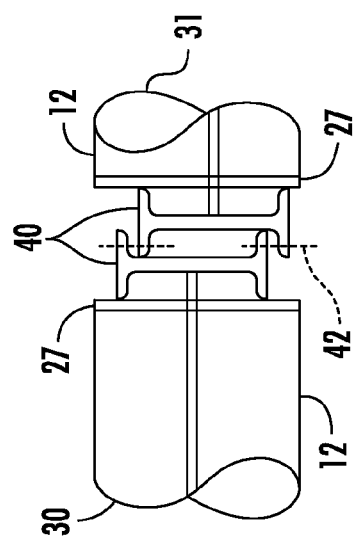
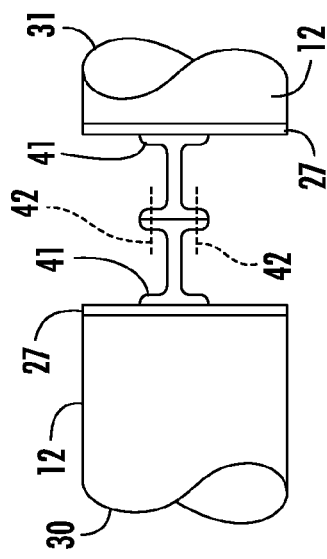
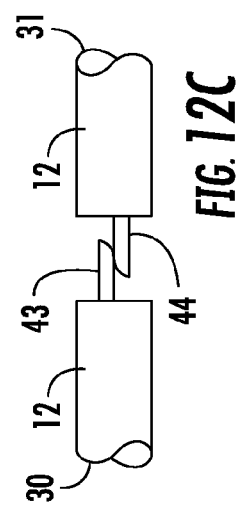
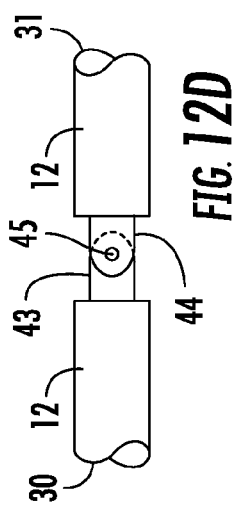
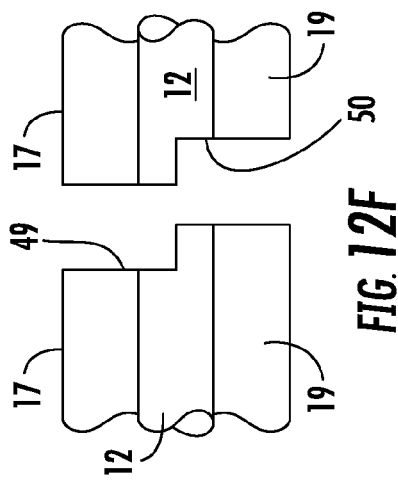
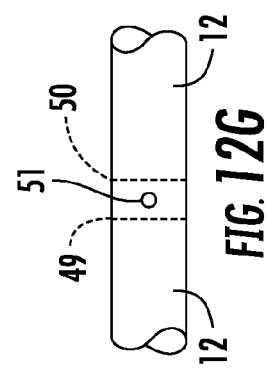

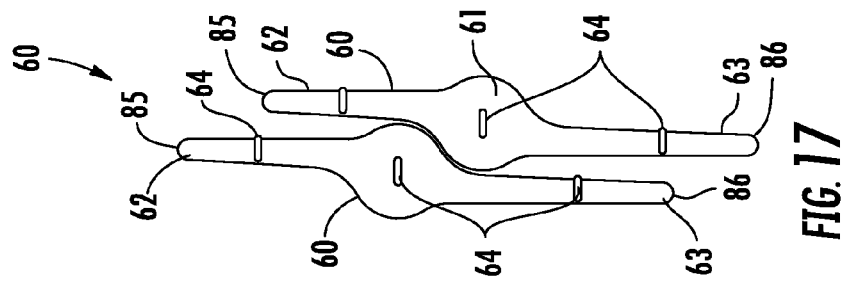
FIG. 17
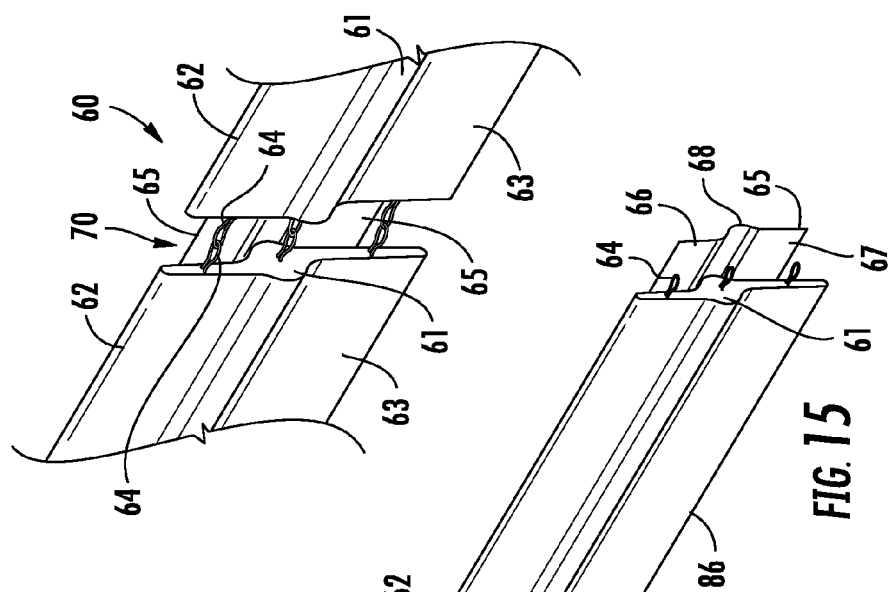
FIG. 16
FIG. 15
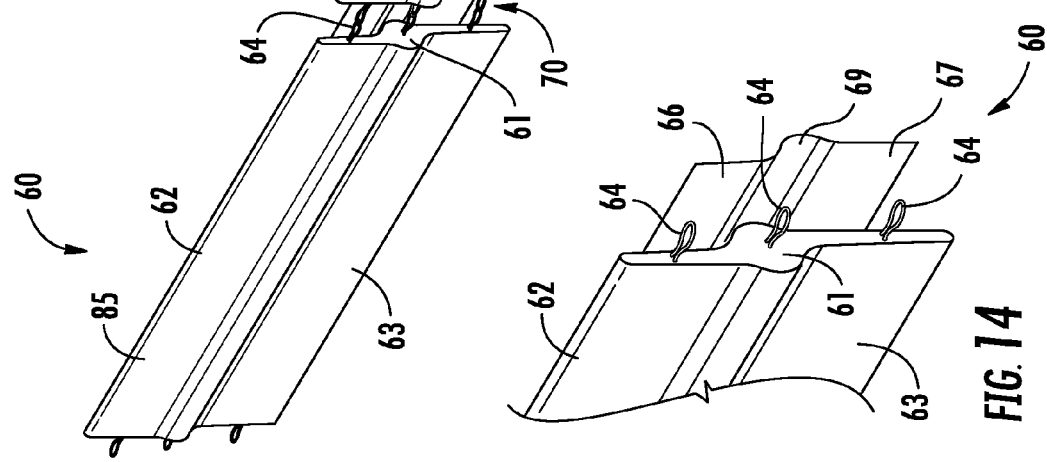
FIG. 14

FLOATING OIL CONTAINMENT BOOM

CROSS-REFERENCE TO RELATED APPLICATIONS

This is a continuation of U.S. patent application Ser. No. 13/173,808, filed Jun. 30, 2011 (issued as U.S. Pat. No. 8,915,673 on Dec. 23, 2014), which claims benefit of U.S. Provisional Patent Application Ser. No. 61/360,813, filed Jul. 1, 2010.

Priority of U.S. Provisional Patent Application Ser. No. 61/360,813, filed Jul. 1, 2010, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to containment booms for containing or blocking floating oil. Even more particularly, the present invention relates to a floating oil containment boom that is comprised of sections of tubular members or pipes, each having a lower plate section or keel and an upper plate section or seawall that blocks oil flow and wherein a specially configured joint allows for sea state induced movement of the boom sections while also sealing the area in between two such pipe or tubular members.

2. General Background of the Invention

Drilling for oil or natural gas in deep water has generated spill problems that require the deployment of floating booms to contain or block the flow of oil wherein delicate ecosystems or beaches must be protected. Patents have issued for floating booms that are designed to contain floating oil. Examples are U.S. Pat. Nos. 4,096,700; 4,155,664; and 4,507,017.

BRIEF SUMMARY OF THE INVENTION

The present invention provides an improved oil containment boom that is constructed of a plurality of hollow pipe or tubing sections connected end to end with a specially configured sealing connector.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is an elevation view of a preferred embodiment of the apparatus of the present invention;

FIG. 2 is a partial top view of a preferred embodiment of the apparatus of the present invention;

FIG. 3 is an end view of a preferred embodiment of the apparatus of the present invention;

FIG. 4 is a perspective view of a preferred embodiment of the apparatus of the present invention;

FIG. 5 is an end detail perspective view of a preferred embodiment of the apparatus of the present invention;

FIG. 6 is a perspective connection detail view of a preferred embodiment of the apparatus of the present invention;

FIGS. 12A-12G and 13A-13E show various alternate connection arrangements for joining one boom section to another boom section;

FIG. 14 is a partial perspective view of the alternate embodiment of the apparatus of the present invention;

FIG. 15 is a partial perspective view of the alternate embodiment of the apparatus of the present invention;

FIG. 16 is a fragmentary perspective view of the alternate embodiment of the apparatus of the present invention;

FIG. 17 is an end view of the alternate embodiment of the apparatus of the present invention;

DETAILED DESCRIPTION OF THE INVENTION

FIGS. 1-20 show a preferred embodiment of the apparatus of the present invention designated generally by the numeral 10. Oil containment boom 10 is designed to float on a water surface 11 and restrict or contain oil that might otherwise travel beyond the boom 10 and into a fragile environment such as a beach, marsh, shoreline, inlet, bay, or the like.

Figure 7:
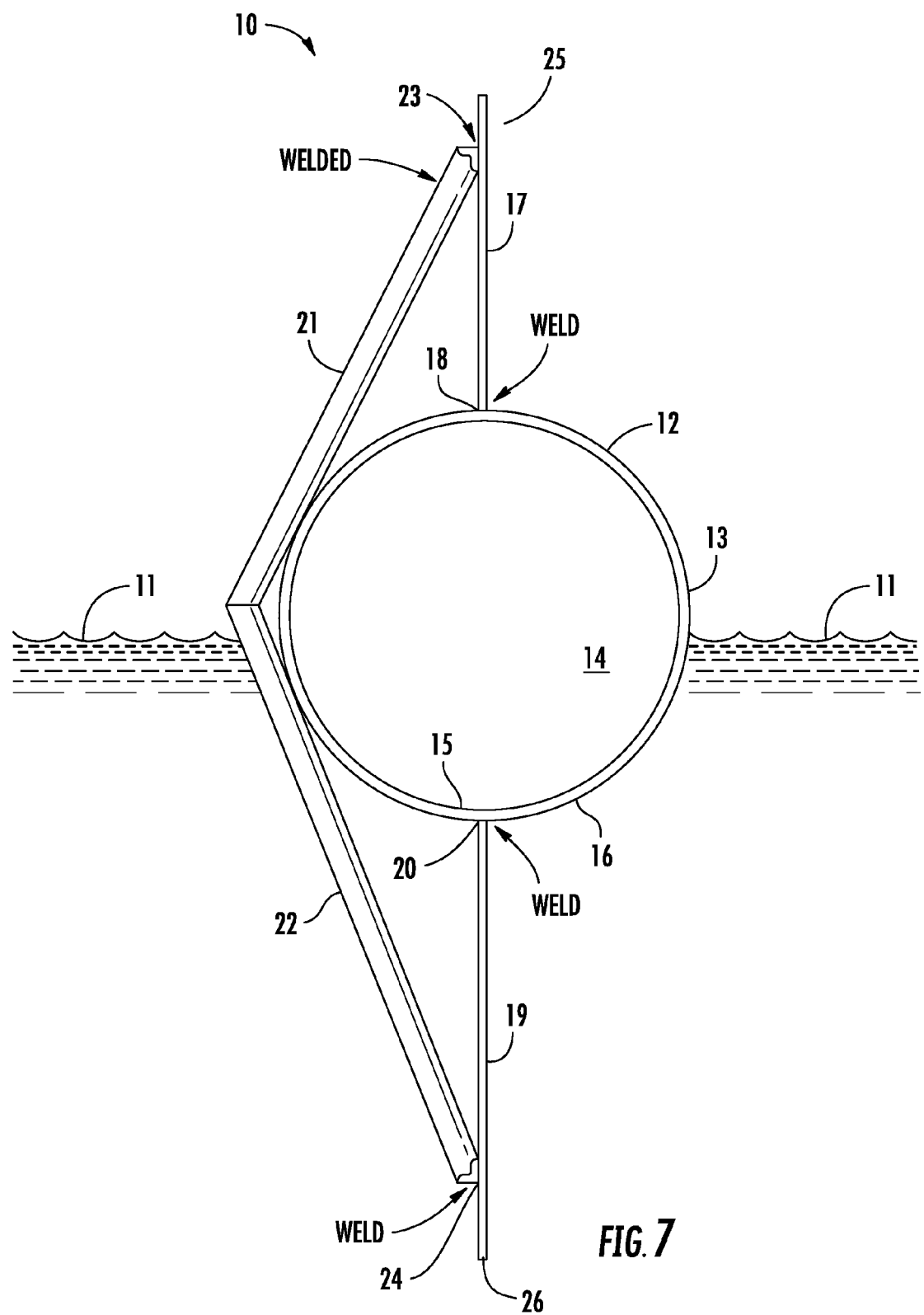
FIGS. 7-8 are sectional elevation views of a preferred embodiment of the apparatus of the present invention.
Figure 8:
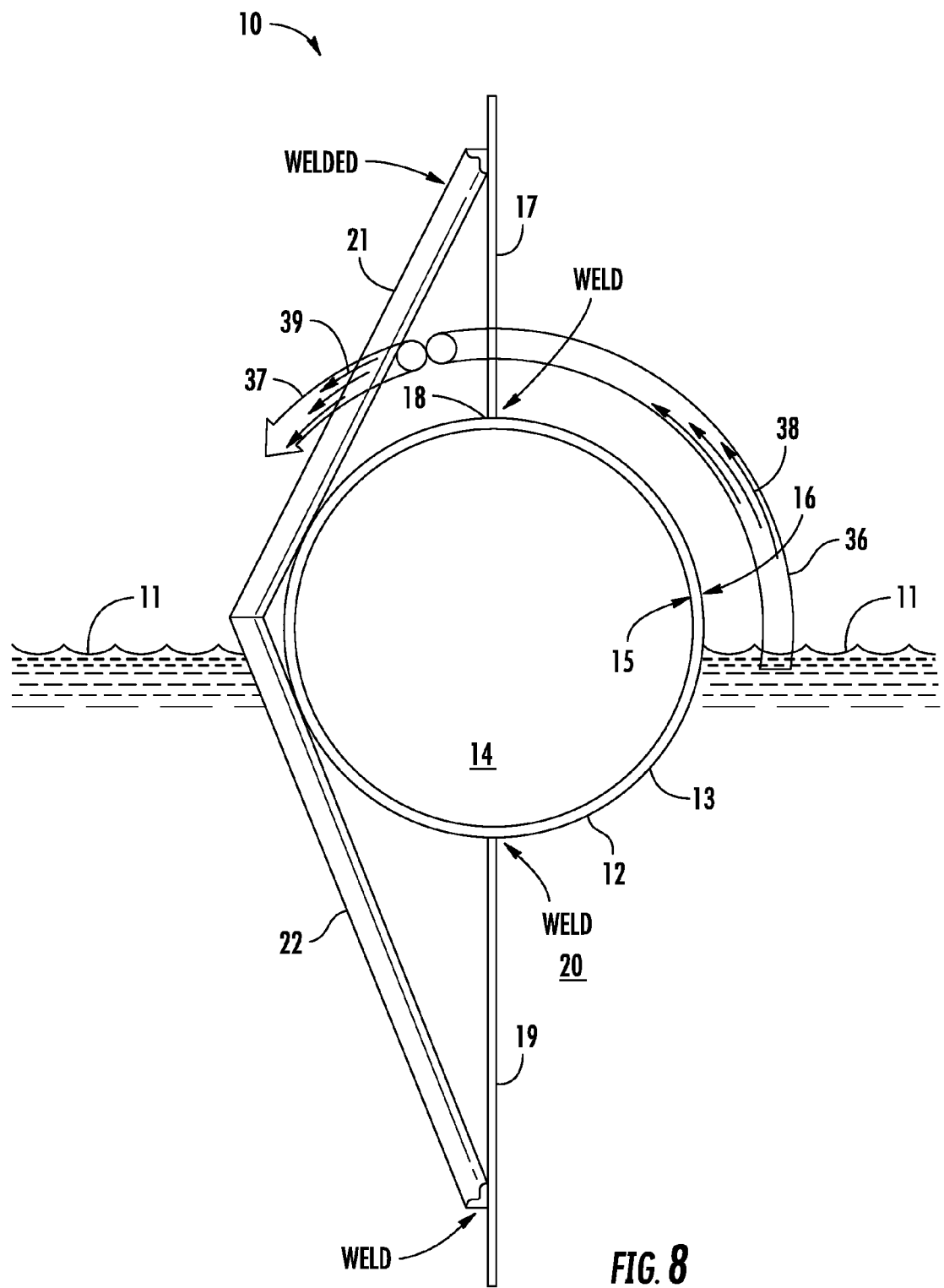
Figure 9:
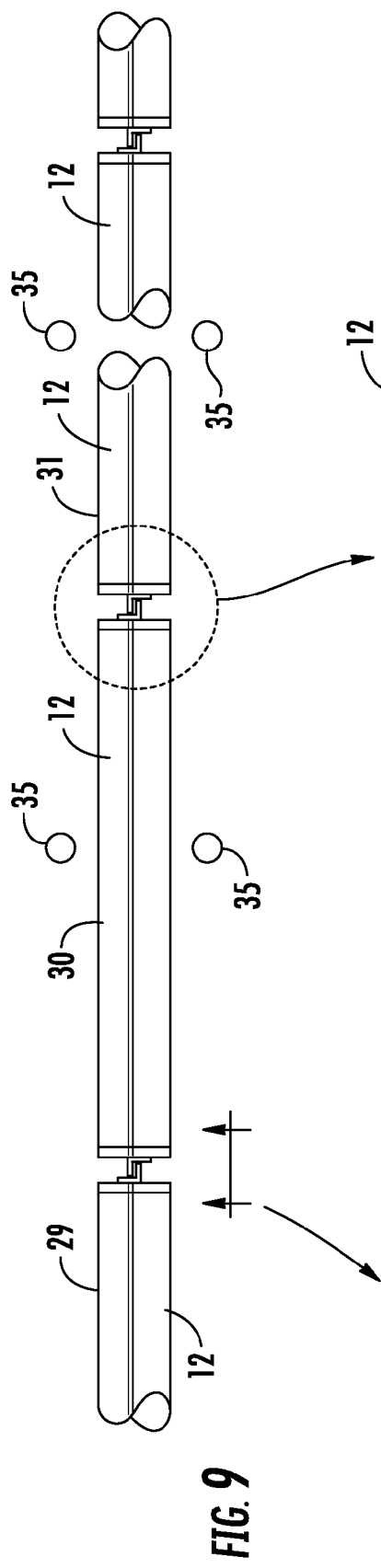
FIG. 9 is an partial top view of a preferred embodiment of the apparatus of the present invention.
Figure 10:
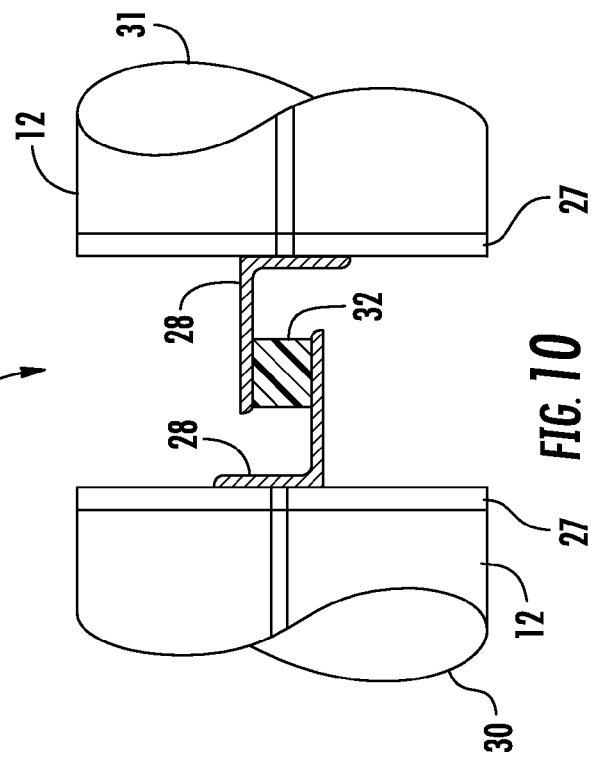
FIG. 10 is an partial top view of a preferred embodiment of the apparatus of the present invention.
Figure 11:
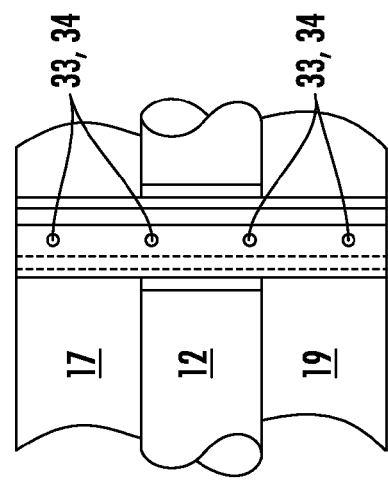
FIG. 11 is a partial elevation view of a preferred embodiment of the apparatus of the present invention.

Boom 10 is comprised of many boom sections such as sections 29, 30, 31 (see FIG. 9). Each boom section 29 or 30 or 31 is connected to another boom section with a specially configured joint or connection as seen for example in FIGS. 9-11. The joint or connection enables one boom section 30 to move relative to another boom section 29 or 31 such as when wave action or wind exists.

Each boom section 29, 30, 31 includes a tubular member or pipe 12 having a pipe wall 13 surrounding an interior 14. Wall 13 has inner surface 15 and outer surface 16. An upper plate or wall 17 is connected (e.g. welded) at connection 18 to pipe 12 outer wall surface 16. A lower plate or wall 19 is connected (e.g. welded) at connection 20 to pipe 12 outer wall surface 16 (see FIGS. 7-8).

Diagonal braces, beams or supports 21, 22 can be provided, spanning from pipe or tubular member 12 to each of the walls 17, 19 as seen in FIGS. 1, 3 and 7-8. Each brace or beam 21, 22 can be a flanged beam or other structural member. Upper brace or beam 21 is connected (e.g. welded) to pipe 12 and to upper plate or wall 17 at weld 23 at upper end 25 of wall or plate 17. Similarly, lower brace or beam 22 is connected (e.g. welded) to pipe 12 and to lower plate or wall 19 at weld 24 at lower end 26 of wall or plate 19 (see FIGS. 7-8).

Each pipe or tubular member 12 has an end plate 27 connected (e.g. welded) thereto for forming a watertight closed chamber with pipe 12. Each end plate 27 has flanged beam 28 which has a dual function (see FIG. 10). The beam 28 reinforces the plate 27 against bending or other failure. The beam 28 is also a location for connection of an elastomeric member 32 which allows some flexing while providing a water fluid seal that prevents the passage of oil or water. Flanged beams 28 can be provided with spaced apart openings 33. Similarly spaced openings are provided in elastomeric member 32. In this fashion, bolted connections 34 can be used to join flanged beams 28 of two adjacent boom sections 29, 30, or 31 to an elastomeric member 32 for both a structural connection and a fluid tight seal (see FIG. 10-11).

Piling or anchors 35 can be placed on opposing sides of the boom 10 as seen in FIG. 9. The boom 10 of the present invention can be used to contain oil or an oil spill or chemical spill. When fitted with a hose or flowline 36, the boom 10 can also assist in recovery of oil as indicated by arrows 38, 39 in FIG. 8. For coastal restoration, hose or flowline 37 can be used to pump sand behind boom 10 for filling areas in between low lying land and the boom 10 wherein the boom 10 confines or contains this fill material to a selected locale (see arrow 39 in FIG. 8).

FIGS. 12A-12G and 13A-13E show other possible connections for joining one boom section 30 to another section 29 or 31. In FIGS. 12A and 12B, beam shaped connectors 40, 41 are shown. These beam shaped connectors 40, 41 can be connected to each other with bolted connections 42. Each of the beam shaped connectors 40, 41 can be attached to an end plate 27 or to an upper plate or lower plate 17, 19 with an appropriate connection such as welding. In FIGS. 12C and 12D, plates 43, 44 can be connected (for example, welded) to an end plate 27 the plates 43, 44 can be connected using a pivotal connection or pivot 45. Instead of the two plates 43, 44 of FIGS. 12C and 12D, three plates 46, 47, 48 could be employed. A pivot or pivotal connection such as the pivotal connection 45 of FIG. 12D could also be used to connect the plates 46, 47 and 48. The plate 46 would be welded to an end plate 27 of one boom section such as 30, and the plates 47, 48 would be welded to an end plate 27 of another boom section such as 31.

FIGS. 12F and 12G show interlocking offset portions 49, 50 which could be joined using a pinned connection 51.

Figure 13A:
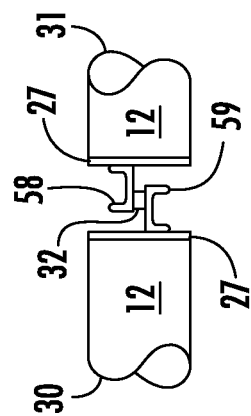
Figure 13C:
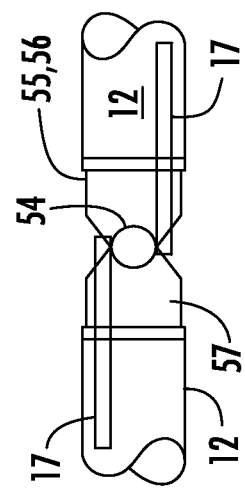
Figure 13D:
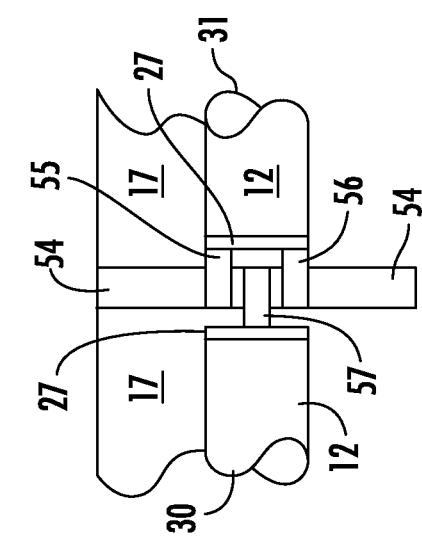
Figure 13B:
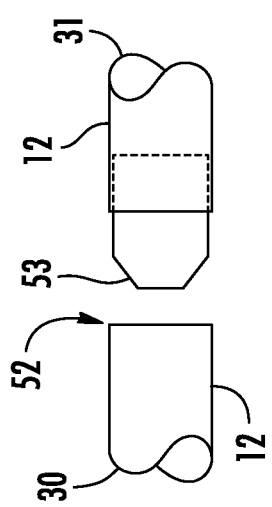

FIGS. 13A-13B show another connection which employs a tapered projection 53 on one pipe or tubular member of one boom such as 30 and a socket 52 on the pipe or tubular section 12 of another boom section. The projecting member 53 could be of a pliable material such as a polymeric material.

FIGS. 13C-13D show another arrangement wherein a post or vertical cylindrically shaped member 54 joins horizontal plates 55 and 56 with horizontal plate 57. The plate 57 is attached to an end plate 27. The plates 55, 56 are attached to the plate 27 of a boom section such as 31 as shown in FIG. 13B. The connection of each plate 55, 56, 57 to post 54 could be a pivotal connection.

Figure 13E:
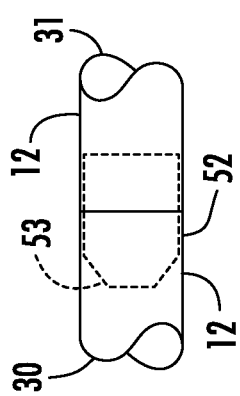

In FIG. 13E, channel beams 58, 59 are provided. One channel beam 58 is attached to an end plate 27 of a pipe or tubular member 12 of a boom section such as 31. The other channel beam 59 is connected to an end plate 27 of a pipe or tubular member 12 of a boom section 30.

FIGS. 14-17 show an alternate embodiment of the apparatus of the present invention designated generally by the numeral 60. In FIGS. 14-17 floating containment boom provides a central tubular or cylindrically shaped section 61, upper portion 62 and lower portion 63. The central tubular or cylindrical section 61 can be integrally formed with the upper section 62 and the lower section 63, such as being constructed of a polymeric material. Imbedded within the central tubular or cylindrical section 61 are connection portions or eyelets 64.

A shield or seal member 65 can be adhered to the combination of central tubular or cylindrical section 61, upper portion 62, and lower portion 63 using an adhesive material (or other connection such as a bolted connection or the like). The shield or seal member 65 would thus cover any gap 70 in between two connected boom sections such as sections 85 and 86 in FIG. 15. The shield or seal member 65 has an upper section 66, lower section 67 and middle section 68 (see FIG. 15). The middle section can provide a concave portion 69 for conforming generally to the shape of the central tubular or cylindrical section 61 as shown in FIG. 14.

An alternate arrangement of FIG. 17 stacks or staggers two floating containment booms 60, as shown in FIG. 17, wherein the floating containment booms 60 are staggered so that one boom section 60 covers the gap 70 between two connected boom sections such as 85 and 86. The connecting portions or eyelets 64 can be joined using any suitable link or linkage, such as shackles as an example.

Figure 18:
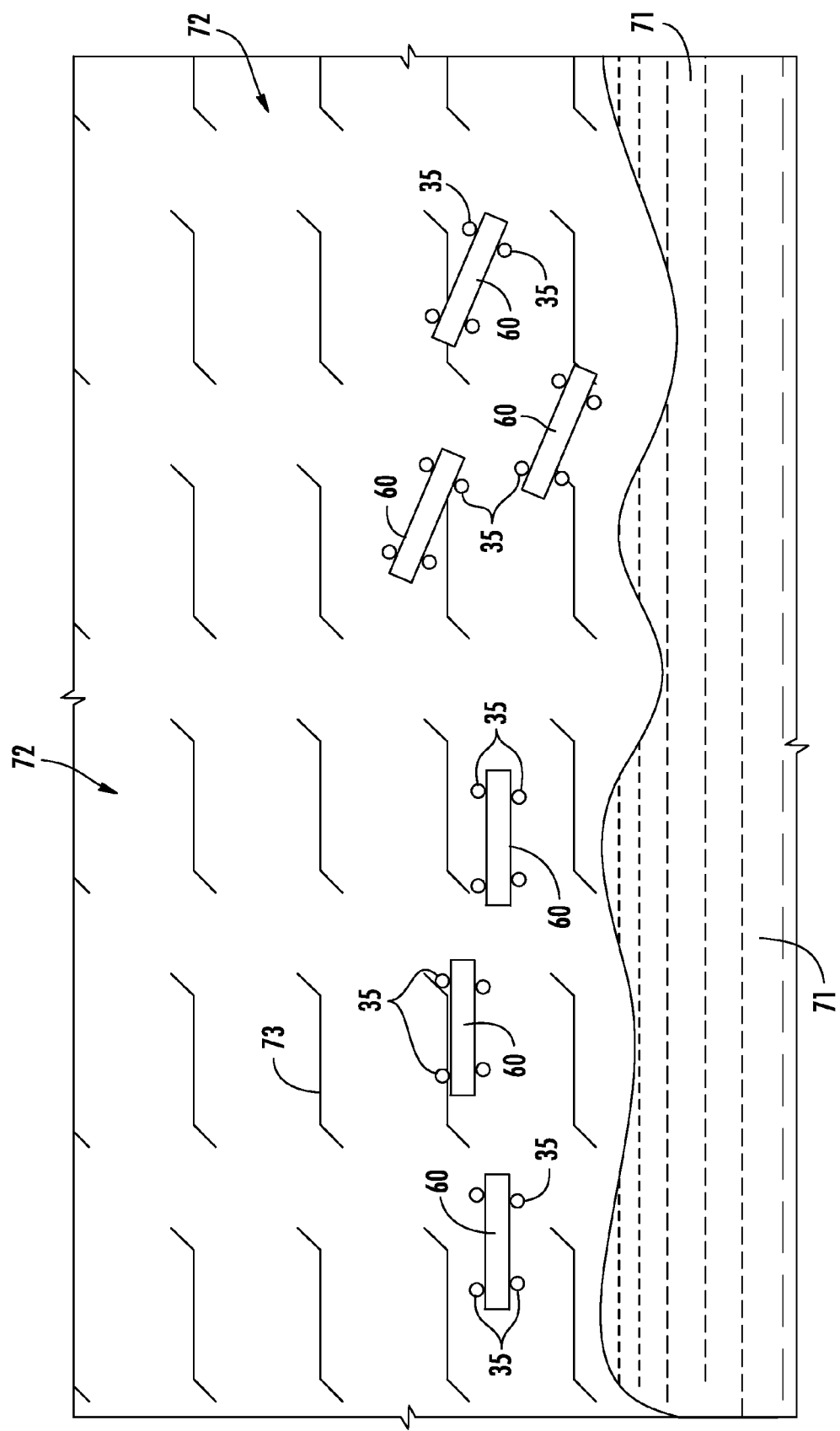
FIG. 18 is a plan view illustrating installation of the apparatus of the present invention along a beach.
Figure 19:
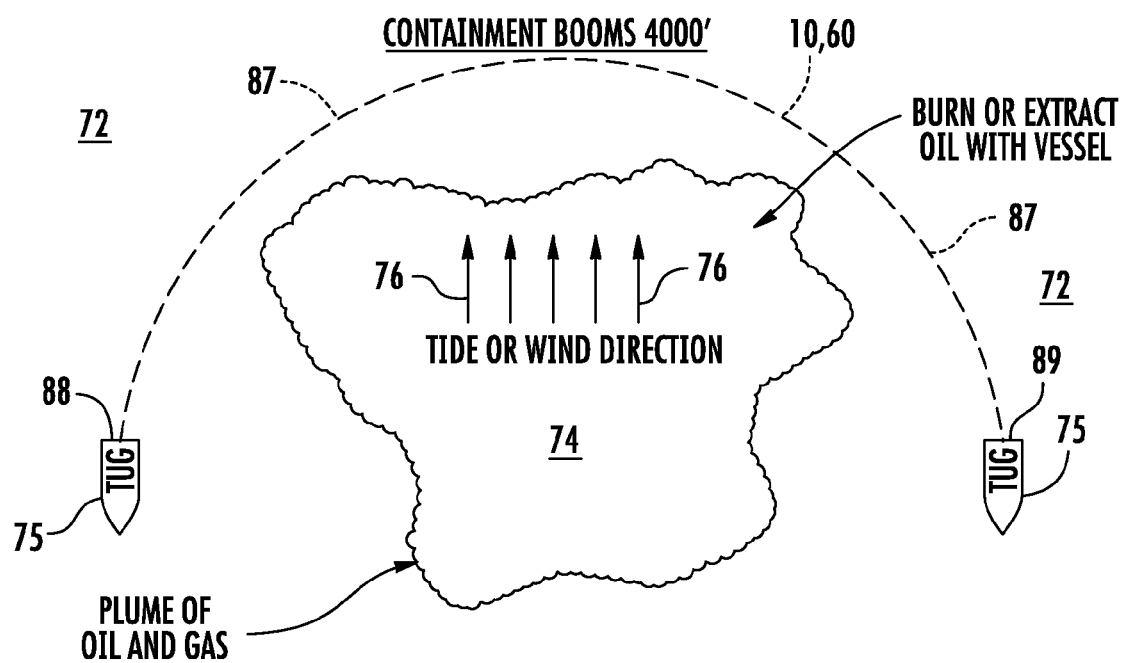
FIG. 19 is a plan view illustrating the method of the present invention, and using the apparatus of the present invention for containing an oil spill.
Figure 20:
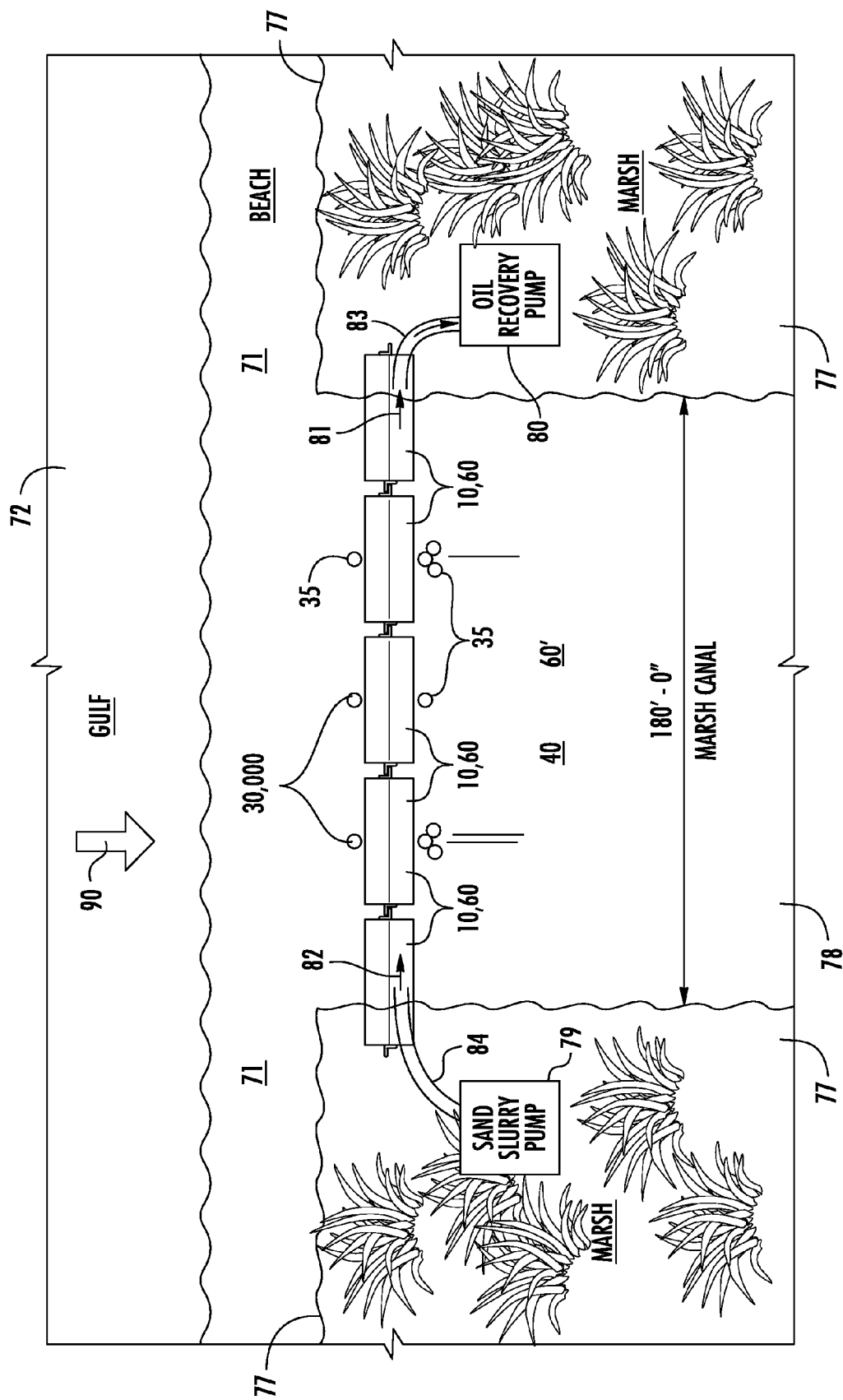
FIG. 20 is a plan view of the preferred embodiment of the apparatus of the present invention illustrating the protection of an interior marsh area.

FIGS. 18-20 are examples of installations using the floating containment boom 10 or 60 of the present invention. In FIG. 18, a body of water such as gulf or lake 72 has a beach area 71 to be protected. The numeral 73 in FIG. 18 represents incoming wave action. The booms 60 shown in FIG. 18 could alternatively have been the booms 10 of FIGS. 1-13. In FIG. 18, piling 35 or other anchors could be used to anchor the booms 10 or 60 in a selected position.

FIG. 19 is an example of using the booms 10, 60 for oil containment. In FIG. 19, there is shown an oil spill 74. Multiple containment booms 10 or 60 can be connected end to end to form an overall boom 87 with its end 88 connected to a tug 75 and its other end 89 connected to a tug 75. The tugs 75 would then move in a direction generally parallel to each other pulling the boom 87 toward the spill 74 and in a direction that is opposite to tide or wind direction 76.

FIG. 20 is an example of using the booms 10 or 60 to protect an inland marsh 77. Such an inland marsh 77 often has a canal 78 that could allow invasion by an oil spill 74. In FIG. 20, multiple booms 10 or 60 are connected together end to end as shown to block access to canal 78. The booms 10 or 60 could be anchored using piling 35 or other anchors. In FIG. 20, a sand or slurry pump 79 could be used to transfer sand or other slurried material through flow line 84 to an area behind the booms 10, 60 for building a land mass that would prevent invasion of an oil spill. An oil recovery pump 80 could be used to pump oil through flow line 83 from a position of collection in front of the booms 10 or 60, namely that oil which is part of a spill 74 and which is driven by a wind or tide in the direction of arrow 90. Arrow 81 in FIG. 20 illustrates the transfer of oil from a position in front of the boom sections 10, 60 to an oil recovery pump 80 via flow line 83. Such recovered oil could be pumped to a storage tank, barge, vessel or the like. Arrow 82 in FIG. 20 illustrates a transfer of sand or other slurried material to a position behind the booms 10 or 60 via flow line 84.

The following is a list of parts and materials suitable for use in the present invention.

PARTS LIST

Part Number Description 10 floating oil containment boom
11 water surface
12 pipe/tubular member
13 wall
14 interior
15 inner surface
16 outer surface
17 upper plate/wall
18 connection/weld
19 lower plate/wall
20 connection/weld
21 bracing/diagonal support
22 bracing/diagonal support
23 connection/weld
24 connection/weld
25 upper end
26 lower end
27 end plate
28 flanged beam
29 boom section
30 boom section
31 boom section
32 elastomeric member
33 opening
34 bolted connection
35 piling/anchor
36 oil suction hose/flowline
37 sand discharge hose/flowline
38 arrow
39 arrow
40 beam shaped connector
41 beam shaped connector
42 bolted connection
43 plate
44 plate
45 pivotal connection
46 plate
47 plate
48 plate
49 interlocking offset portion
50 interlocking offset portion
51 pinned connection
52 socket
53 tapered projection
54 post
55 horizontal plate
56 horizontal plate
57 horizontal plate
58 channel beam
59 channel beam
60 floating containment boom
61 central tubular/cylindrical section
62 upper portion
63 lower portion
64 connector/eyelet
65 shield/seal member
66 upper section
67 lower section
68 middle section
69 concave portion
70 gap
71 beach
72 body of water/gulf/lake
73 wave action
74 oil spill
75 tug
76 arrow, tide or wind direction
77 interior marsh
78 canal
79 sand slurry pump
80 oil recovery pump
81 arrow
82 arrow
83 flow line
84 flow line
85 boom section
86 boom section
87 boom
88 end
89 end
90 arrow All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A floating oil containment boom, comprising:
   a) a plurality of boom sections connected end to end;
   b) each section including a hollow tubular member having a diameter, a tubular side wall, inner surface and outer surface;
   c) closure plates that close the ends of the tubular member so that it floats;
   d) each boom section including an upper plate that extends along an upper portion of the tubular member and a lower plate that extends along a lower portion of the tubular member;
   e) a connection that joins each boom section to another boom section, each connection extending above and below the outer surface of the tubular member;
   f) the connection comprised of a flanged beam on each closure plate, each flanged beam including a first flange attached to the closure plate that reinforces the closure plate and a second flange extending away from the first flange;
   g) an elastomeric member fastened to a pair of said beams at said second flange;
   h) said connection including one or more bolted connections that connect the said second flanges of adjacent boom sections to the elastomeric member;
   i) wherein the first flange of each flanged beam is connected to the upper and lower plates of said boom section;
   j) wherein each elastomeric member extends vertically from the upper plate to the lower plate; and
   k) wherein there is a gap in between a first said beam and a second said beam, wherein said elastomeric member occupies said gap to: 1) connect the first beam to the second beam and 2) provide a fluid seal that extends generally vertically a distance that is above and below the closure plates.

2. The floating oil containment boom of claim 1 wherein the elastomeric member is of a polyurethane material.

3. The floating oil containment boom of claim 1 wherein the lower plate is heavier than the upper plate.

4. The floating oil containment boom of claim 1 wherein the lower plate is taller than the upper plate.

5. The floating oil containment boom of claim 1 wherein the beams are flanged beams.

6. The floating oil containment boom of claim 5 wherein the beams are angle shaped beams.

7. The floating oil containment boom of claim 5 wherein the beams are I-beams.

8. The floating oil containment boom of claim 5 wherein the beams are channel beams.

9. The floating oil containment boom of claim 5 wherein the beams are wide flanged beams.

10. The floating oil containment boom of claim 1 wherein the tubular member is foam filled.

\* \* \* \* \*